United States Patent
Bulan et al.

(10) Patent No.: US 11,499,833 B2
(45) Date of Patent: Nov. 15, 2022

(54) INFERRING LANE BOUNDARIES VIA HIGH SPEED VEHICLE TELEMETRY

(71) Applicant: GM GLOBAL TECHNOLOGY OPERATIONS LLC, Detroit, MI (US)

(72) Inventors: Orhan Bulan, Novi, MI (US); Sheetal Mahesh, Pflugerville, TX (US); Yehenew G. Mengistu, Sterling Heights, MI (US); David H. Clifford, Royal Oak, MI (US)

(73) Assignee: GM Global Technology Operations LLC, Detroit, MI (US)

(*) Notice: Subject to any disclaimer, the term of this patent is extended or adjusted under 35 U.S.C. 154(b) by 528 days.

(21) Appl. No.: 16/582,672

(22) Filed: Sep. 25, 2019

(65) Prior Publication Data

US 2021/0088340 A1 Mar. 25, 2021

(51) Int. Cl.
| | |
|---|---|
| G06T 7/70 | (2017.01) |
| G06V 20/56 | (2022.01) |
| G01C 21/32 | (2006.01) |
| H04W 4/44 | (2018.01) |
| G06T 19/00 | (2011.01) |

(52) U.S. Cl.
CPC .............. *G01C 21/32* (2013.01); *G06T 7/70* (2017.01); *G06T 19/006* (2013.01); *G06V 20/588* (2022.01); *H04W 4/44* (2018.02); *G06T 2207/30256* (2013.01)

(58) Field of Classification Search
None
See application file for complete search history.

(56) References Cited

U.S. PATENT DOCUMENTS

| | | | | |
|---|---|---|---|---|
| 9,784,592 | B2 * | 10/2017 | Gupta | B60W 30/00 |
| 9,969,325 | B2 * | 5/2018 | Lection | G08G 1/167 |
| 10,435,020 | B2 * | 10/2019 | Iyengar | G05D 1/0061 |
| 10,482,761 | B2 * | 11/2019 | Dorum | G06F 16/29 |
| 10,853,665 | B2 * | 12/2020 | Kang | G06K 9/6262 |
| 11,200,431 | B2 * | 12/2021 | Fowe | G08G 1/096783 |
| 2019/0347493 | A1 * | 11/2019 | Chen | G08G 1/167 |
| 2020/0132476 | A1 * | 4/2020 | Roeth | G06V 20/588 |
| 2020/0406754 | A1 * | 12/2020 | Kassner | G01C 21/365 |

* cited by examiner

*Primary Examiner* — Todd Melton
(74) *Attorney, Agent, or Firm* — Quinn IP Law

(57) ABSTRACT

A system for inferring lane boundaries via vehicle telemetry for a road section is provided. The system includes a computerized remote server device operable to receive through a communications network sensor data describing lane markings upon roads bordering the road section, determine established lanes upon roads bordering the road section based upon the sensor data, receive through the communications network the vehicle telemetry generated by a plurality of vehicles traversing the road section, generate inferred lanes for the road section based upon the vehicle telemetry, match the inferred lanes to the established lanes to generate unified lane geometries, and publish the unified lane geometries.

20 Claims, 9 Drawing Sheets

INFERRING LANE BOUNDARIES VIA HIGH SPEED VEHICLE TELEMETRY

INTRODUCTION

The disclosure generally relates to a system for inferring lane boundaries via high speed vehicle telemetry for an autonomous or semi-autonomous vehicle.

Navigation systems for autonomous and semi-autonomous vehicle utilize computerized algorithms to determine a navigational path for the vehicle being controlled. Digital maps and sensor inputs are useful to set the navigational path for the vehicle. However, lane boundaries are not necessarily directly determinable. For example, intersections can include unmarked or confusing lane markings on a road surface. In another example, lanes under an overpass can frustrate map generating algorithms that utilize satellite images to map lane boundaries. In another example, construction, snow, and other abnormal occurrences can create lane boundary abnormalities.

SUMMARY

A system for inferring lane boundaries via vehicle telemetry for a road section is provided. The system includes a computerized remote server device operable to receive through a communications network sensor data describing lane markings upon roads bordering the road section, determine established lanes upon roads bordering the road section based upon the sensor data, receive through the communications network the vehicle telemetry generated by a plurality of vehicles traversing the road section, generate inferred lanes for the road section based upon the vehicle telemetry, match the inferred lanes to the established lanes to generate unified lane geometries, and publish the unified lane geometries.

In some embodiments, generating the inferred lanes for the road section based upon the vehicle telemetry includes aggregating the vehicle telemetry.

In some embodiments, generating the inferred lanes for the road section based upon the vehicle telemetry further includes normalizing the vehicle telemetry.

In some embodiments, generating the inferred lanes for the road section based upon the vehicle telemetry further includes denoising the vehicle telemetry.

In some embodiments, generating the inferred lanes for the road section based upon the vehicle telemetry further includes converting the vehicle telemetry to normal vectors representing vehicle paths.

In some embodiments, generating the inferred lanes for the road section based upon the vehicle telemetry includes identifying trajectories that originate from each established lane entering the road section, analyzing the trajectories across the road section, and selecting a most common trajectory that originates from each of the established lanes as an inferred lane for the road section.

In some embodiments, the computerized remote server device is further operable to identify the road section as a road section including insufficient lane markings to determine the established lanes.

In some embodiments, the computerized remote server device is further operable to identify the road section as a road section including obscured lane markings.

In some embodiments, the system further includes a vehicle navigating across the road section based upon one of the unified lane geometries.

In some embodiments, generating the inferred lanes for the road section based upon the vehicle telemetry includes adjusting a lane boundary for one of the inferred lanes based upon a lane boundary for a second of the inferred lanes.

According to one alternative embodiment, a system for generating inferred lanes for a road section is provided. The system includes a vehicle including a computerized navigation control module operable to generate vehicle telemetry for the vehicle and transmit the vehicle telemetry over a communications network. The system further includes a computerized remote server device operable to receive through the communications network sensor data describing lane markings upon roads bordering the road section, determine established lanes upon roads bordering the road section based upon the sensor data, receive through the communications network vehicle telemetry generated by a plurality of vehicles traversing the road section, generate inferred lanes for the road section based upon the vehicle telemetry, match the inferred lanes to the established lanes to generate a unified lane geometry, and transmit through the communications network the unified lane geometry to the vehicle. The computerized navigation control module is further operable to receive the unified lane geometry and navigate the vehicle across the road section based upon unified lane geometry.

In some embodiments, generating the inferred lanes for the road section based upon the vehicle telemetry includes aggregating the vehicle telemetry, normalizing the vehicle telemetry, and denoising the vehicle telemetry.

In some embodiments, generating the inferred lanes for the road section based upon the vehicle telemetry further includes converting the vehicle telemetry to normal vectors representing vehicle paths.

In some embodiments, generating the inferred lanes for the road section based upon the vehicle telemetry includes identifying trajectories that originate from each established lane entering the road section, analyzing the trajectories across the road section, and selecting a most common trajectory that originates from each of the established lanes as an inferred lane for the road section.

According to one alternative embodiment, a system for generating inferred lanes for a road section is provided. The system includes a computerized remote server device operable to receive through a communications network sensor data describing lane markings upon roads bordering the road section, determine established lanes upon roads bordering the road section based upon the sensor data, receive through the communications network vehicle telemetry generated by a plurality of vehicles traversing the road section, generate inferred lanes for the road section based upon the vehicle telemetry, match the inferred lanes to the established lanes to generate unified lane geometries, and transmit the unified lane geometries over the communications network. The system further includes a remote computing platform operable to receive the unified lane geometries and provide navigation guidance based upon the unified lane geometries.

In some embodiments, the remote computing platform includes a smart phone.

In some embodiments, the remote computing platform includes a virtual reality device.

In some embodiments, the remote computing platform includes an augmented reality device.

In some embodiments, remote computing platform includes an infrastructure device.

In some embodiments, providing navigation guidance based upon the unified lane geometries includes projecting graphics upon the road section.

The above features and advantages and other features and advantages of the present disclosure are readily apparent from the following detailed description of the best modes for carrying out the disclosure when taken in connection with the accompanying drawings.

DETAILED DESCRIPTION

Figure 1:
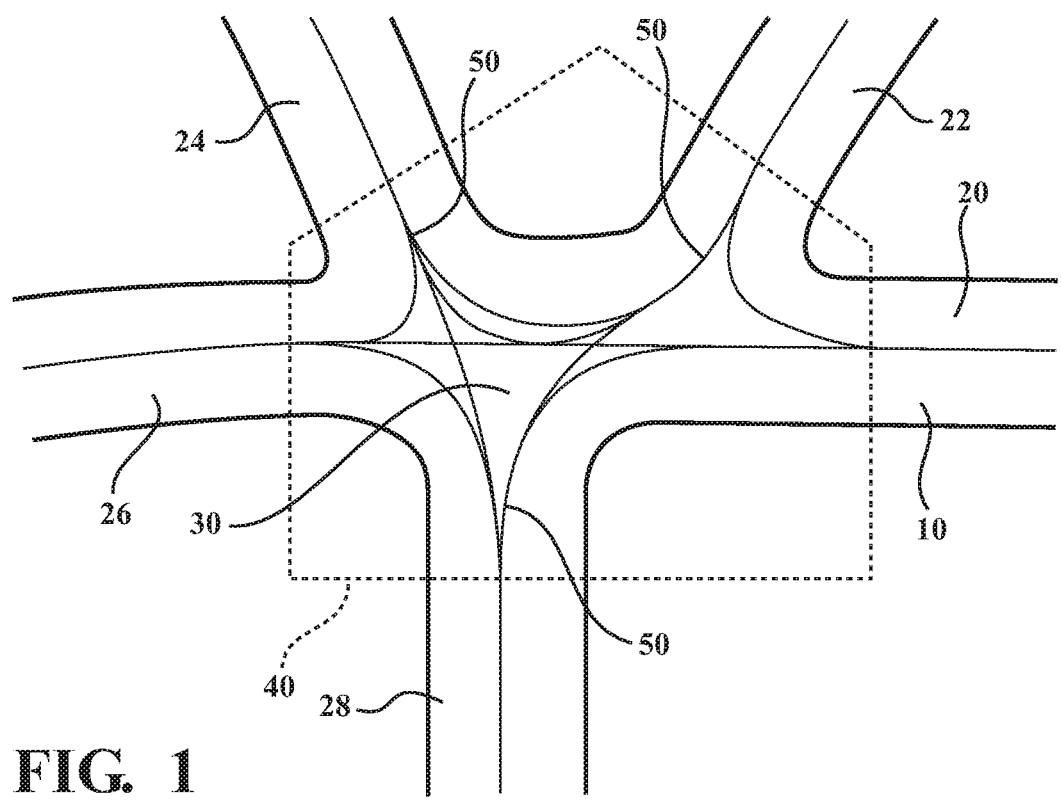
FIG. 1 illustrates an overhead plan view of an exemplary road section including an intersection and a variety of overlapping trajectories that can exist upon the road section, in accordance with the present disclosure.

A system for inferring lane boundaries vis high speed vehicle telemetry is provided. Digital maps can be useful for autonomous and semi-autonomous driving. Accurate maps, images, radar information, LIDAR information, and other data can be used to establish lane boundaries. In areas where lanes are clearly marked and high detail data is available, for example, upon a well-marked road in plain view of satellite or infrastructure cameras, lane boundaries can be directly calculated and/or determined. These determined lane boundaries can be communicated to vehicles and used to guide the vehicles over the well-marked road.

Some roads are well marked and in plain view of sensor devices. Some roads or road sections, such as intersections, can be bare of markings, and human drivers use common sense and experience to traverse the unmarked section of road. Some road section, such as roads that go under an overpass, roads in construction zones where the roadway is not well marked, and roads obscured by conditions such as shadows, snow, leaves, or other items can include lane markings that are difficult or impossible to see with available sensor devices.

A system and process to infer lane boundaries is provided. Vehicles may include communication systems that provide location data to a remote server device. Such location data can be described as vehicle telemetry data or vehicle telemetry. A remote server device can store and analyze such data to generate aggregated telemetry data for a road section. Such aggregated telemetry data can include a plurality of trajectories that can each be said to go from a source to a sink for the road section. In one embodiment, determining trajectory data from telemetry data can include aggregating the telemetry data, normalizing the data, and denoising the data. In one embodiment, the telemetry data is normalized, denoised, and converted into normal vectors representing vehicle paths. Each trajectory stored for a particular road section enters the road section at a point that can be defined as a source, the trajectory of the vehicle runs across a series a points along the road section, and the trajectory ends at a point that can be defined as a sink. These stored trajectories can be laid over each other or the trajectories can be summed, and based upon the sum of the stored trajectories, lane geometry in the road section can be inferred. These inferred lane geometries for the road section can be matched with established lanes that border the road section, such that a unified lane geometry can be generated spanning the road section.

Telemetry data can be transmitted by a vehicle and can include location and trajectory data. In one embodiment, telemetry data can include global positioning system (GPS) receiver data or data related to a global coordinate system. In another embodiment, telemetry data can include data from an inertial measurement unit operable to provide location and motion data based upon movement of the inertial measurement unit. In another embodiment, telemetry data can be improved or corrected, for example, with one data source being used in combination with data from a second data source. In one embodiment, telemetry data can include GPS receiver data combined with data from an inertial measurement unit which can be described a corrective positional data.

FIG. 1 illustrates an exemplary road section including an intersection and a variety of overlapping trajectories that can exist upon the road section. Roadway 10 is illustrated including a plurality of incoming roads 20, 22, 24, 26, and 28 which join at intersection 30. Roads 20, 22, 24, 26, and 28 can each be well marked, for example, with dotted or double paint lines separating lanes upon each of the roads. An area of roadway 10 including intersection 30 can be defined as road section 40 in which lane markings may be absent, unclear, or left to interpretation. A plurality of trajectories 50 can be plotted upon roadway 10, illustrating possible paths that a vehicle or vehicles can traverse roadway 10.

Figure 2:
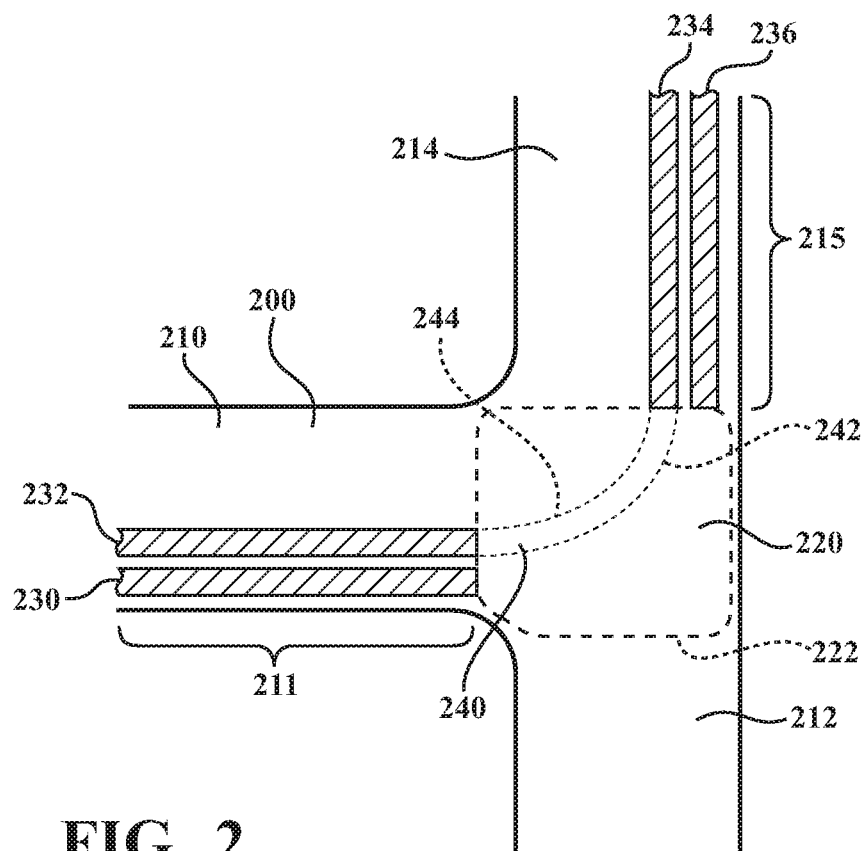
FIG. 2 illustrates an overhead plan view of an exemplary road section including an intersection, a plurality of established lanes bordering the road section, and an inferred lane connecting two of the established lanes through the road section, in accordance with the present disclosure.

FIG. 2 illustrates an exemplary road section including an intersection, a plurality of established lanes bordering the road section, and an inferred lane connecting two of the established lanes through the road section. Roadway 200 is illustrated including roads 210, 212, and 214 that join at intersection 220. Road 210 includes a well-marked section 211, which can be utilized to generate established lanes 230 and 232 within a remote server device, such that the remote server device can provide established lanes 230 and/or 232 to vehicles traversing roadway 200. Similarly, road 214 includes a well-marked section 215, which can be utilized to generate established lanes 234 and 236. A road section 222 including intersection 220 can be defined where lane markings do not exist in order to generate established lanes in the remote server. In accordance with the system and process disclosed herein, an inferred lane 240 including a first inferred lane boundary 242 and a second inferred lane boundary 244 are illustrated, wherein the remote server device utilizes aggregated telemetry data to generate the inferred lane geometry.

Throughout the disclosure, established lanes and inferred lanes are described and illustrated upon roads and road sections. These lanes are definitions generated and stored in programmed code in a remote server device for distribution and use by autonomous and semi-autonomous vehicles traversing the roads and road sections. Illustration herein of lanes and lane boundaries upon road surfaces is intended to describe and enable the disclosed system and method for generating the described established lanes and inferred lanes.

Figure 3:
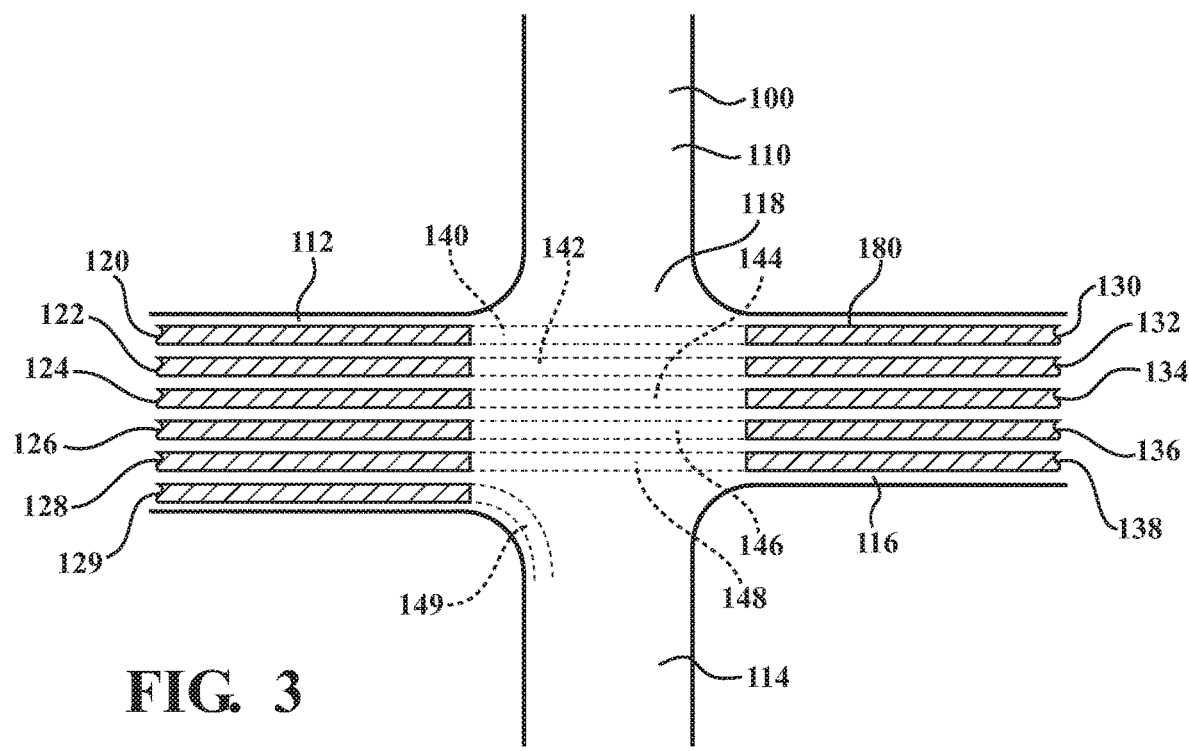
FIG. 3 illustrates an overhead plan view of an exemplary roadway including a road section including an intersection, a plurality of established lanes bordering the road section, and a first plurality of inferred lanes that can be generated based upon a first set of aggregated vehicle telemetry, in accordance with the present disclosure.

FIG. 3 illustrates an exemplary roadway including a road section including an intersection, a plurality of established lanes bordering the road section, and a first plurality of inferred lanes that can be generated based upon a first set of aggregated vehicle telemetry. Roadway 100 is illustrated including roads 110, 112, 114, and 116 that join at intersection 118. Road 112 includes a well-marked section, which can be utilized to generate established lanes 120, 122, 124, 126, 128, and 129 within a remote server device, such that the remote server device can provide one of the established lanes to vehicles traversing roadway 100. Similarly, road 116 includes a well-marked section, which can be utilized to generate established lanes 130, 132, 134, 136, and 138. A road section including intersection 118 can be defined where lane markings do not exist in order to generate established lanes in the remote server. In accordance with the system and process disclosed herein, a plurality of inferred lanes 140, 142, 144, 146, 148, and 149 are illustrated, wherein the remote server device utilizes aggregated telemetry data to generate the inferred lane geometry. Further in accordance with the system and process disclosed herein, each of inferred lanes 140, 142, 144, 146 and 148 are matched with established lanes to generate unified lanes or unified lane geometry across roadway 100 such that the unified lane geometries may be published for use or a vehicle may be supplied with one of the unified lanes in order to travel within the lane across roadway 100. Publishing lane geometries can include any form of dispersing, posting, or making available the inferred lanes and inferred lane boundaries, for example, including navigational instructions to a vehicle, digital map data, electronic data specific to intersections or other road sections, and/or other similar transferable data. In the exemplary embodiment of FIG. 3, established lane 120, inferred lane 140, and established lane 130 together create a single unified lane 180. In the embodiment of FIG. 3, established lane 129 is matched with inferred lane 149, which is generated as a right turn only lane, turning onto road 114. An established lane on road 114 could be generated and matched with inferred lane 149.

Figure 4:
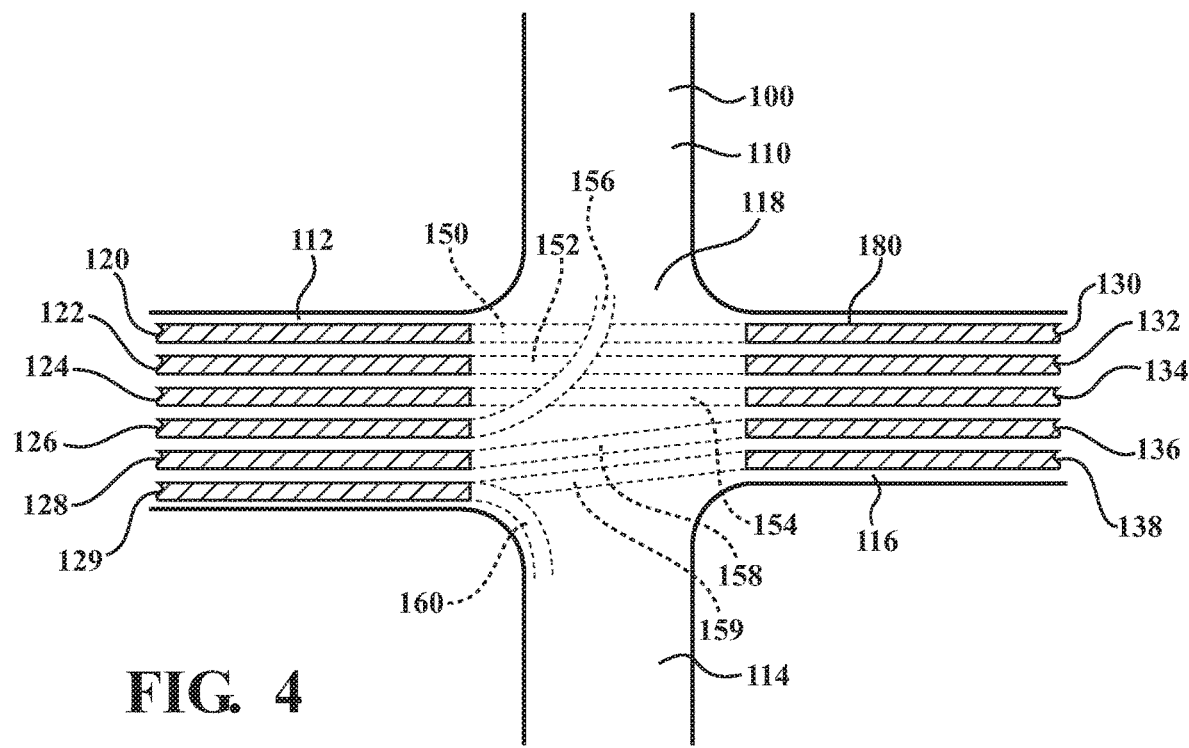
FIG. 4 illustrates an overhead plan view of an exemplary roadway including the road section of FIG. 3 and a second plurality of inferred lanes that can be generated based upon a second set of aggregated vehicle telemetry, in accordance with the present disclosure.

FIG. 4 illustrates an exemplary roadway including the road section of FIG. 3 and a second plurality of inferred lanes that can be generated based upon a second set of aggregated vehicle telemetry. Roadway 100 of FIG. 3 is illustrated in FIG. 4, with a different set of aggregated vehicle telemetry generating a different plurality of inferred lanes upon the same physical roadway. Roadway 100 is illustrated including roads 110, 112, 114, and 116 that join at intersection 118. Road 112 includes a well-marked section, which can be utilized to generate established lanes 120, 122, 124, 126, 128, and 129 within a remote server device, such that the remote server device can provide one of the established lanes to vehicles traversing roadway 100. Similarly, road 116 includes a well-marked section, which can be utilized to generate established lanes 130, 132, 134, 136, and 138. A road section including intersection 118 can be defined where lane markings do not exist in order to generate established lanes in the remote server. In accordance with the system and process disclosed herein, a plurality of inferred lanes 150, 152, 154, 156, 158, and 159 are illustrated, wherein the remote server device utilizes aggregated telemetry data to generate the inferred lane geometry. Further in accordance with the system and process disclosed herein, each of inferred lanes 150, 152, 154, 158 and 159 are matched with established lanes to generate unified lanes or unified lane geometry across roadway 100 such that a vehicle may be supplied with one of the unified lanes in order to travel within the lane across roadway 100. In the embodiment of FIG. 4, established lane 126 is matched with inferred lane 156, which is generated as a left turn only lane, turning onto road 110. Inferred lane 159 is also illustrated including a right turn option 160. An established lane on road 110 could be generated and matched with inferred lane 156.

Based upon different sets of aggregated vehicle telemetries, different inferred lanes can be generated. Vehicle telemetries can change, for example, based upon changing traffic signal devices, for example, prohibiting certain turns at different times of day or based upon special traffic instructions during a roadway maintenance event. A remote server device can adjust lane geometries based upon monitored changing vehicle telemetries, based upon communication with infrastructure resources such as computerized modules controlling traffic signal devices, or based upon sensor data indicating occurrence of an unusual traffic condition, such as monitored camera images showing orange construction barrels or monitored audio sensors recording noises indicating that a fender-bender and resulting traffic backup have occurred. In another embodiment, lane geometries can be periodically or constantly updated based upon aggregated vehicle telemetry acquired through a time period, for example, a previous hour.

Figure 5:
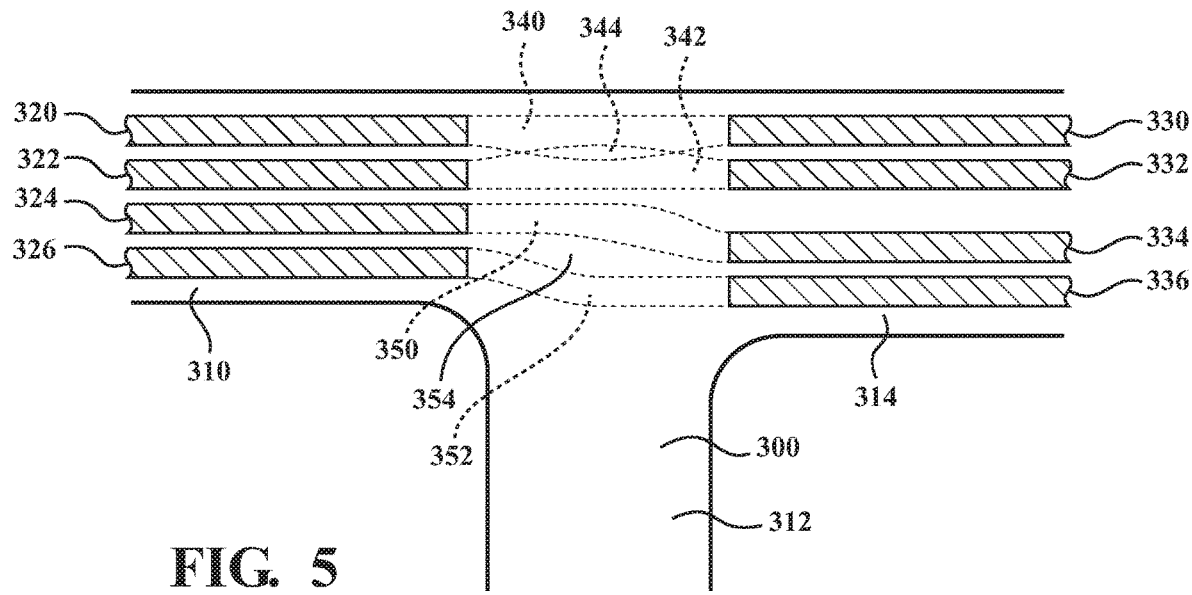
FIG. 5 illustrates an overhead plan view of an exemplary roadway including a road section including an intersection, a plurality of established lanes bordering the road section, and a plurality of inferred lanes that can be generated based upon aggregated vehicle telemetry, wherein the inferred lanes are generated independently of each other, in accordance with the present disclosure.
Figure 6:
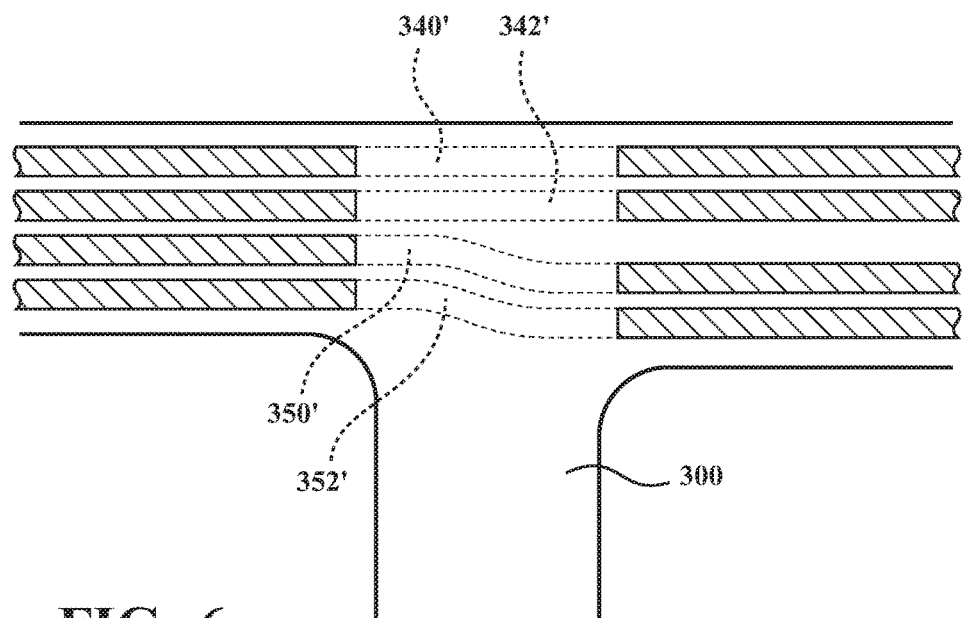
FIG. 6 illustrates an overhead plan view of the roadway of FIG. 5 including a plurality of inferred lanes that are adjusted based upon the lane boundaries of neighboring inferred lanes, in accordance with the present disclosure.

Lane boundaries can be inferred according to aggregated vehicle telemetry data. Lanes on roads frequently exist side-by-side with a boundary of one lane being parallel to or coincident with the boundary of a neighboring lane. An inferred lane can be adjusted based upon the geometry of a neighboring inferred lane. FIG. 5 illustrates an exemplary roadway including a road section including an intersection, a plurality of established lanes bordering the road section, and a plurality of inferred lanes that can be generated based upon aggregated vehicle telemetry, wherein the inferred lanes are generated independently of each other. Roadway 300 is illustrated including roads 310, 312, and 314 that join at an intersection. Established lanes 320, 322, 324, and 326 are identified. Similarly, established lanes 330, 332, 334, and 336 are identified. According to the disclosed system and process, inferred lane 340 is identified connecting established lane 320 and established lane 330, inferred lane 342 is identified connecting established lane 322 and established lane 332, inferred lane 350 is identified connecting established lane 324 and established lane 334, and inferred lane 352 is identified connecting established lane 326 and established lane 336. Inferred lanes 340, 342, 350 and 352 can be generated independently, using aggregated vehicle telemetry to infer lane boundaries for each lane. However, lane boundaries of inferred lane 340 and lane boundaries of inferred lane 342 overlap, creating an area 344 where vehicles instructed by the same remote server device would be in conflict over use of the area. Similarly, lane boundaries of inferred lane 350 and lane boundaries of inferred lane 352 diverge, creating an area 354 where vehicles instructed by the same remote server device would under-utilize the roadway. Areas 344 and 354 can exist for actual reasons, for example, an obstacle existing in the roadway, but based upon sensor information and/or vehicle telemetry, the disclosed system and process can determine that inferred lanes 340, 342, 350, and 352 can be adjusted in light of the boundaries of neighboring inferred lanes. FIG. 6 illustrates the roadway of FIG. 5 including a plurality of inferred lanes that are adjusted based upon the lane boundaries of neighboring inferred lanes. Roadway 300 is illustrated. Inferred lane 340' is adjusted in comparison to inferred lane 340 of FIG. 5, with a lane boundary adjusted to be in parallel to a boundary of inferred lane 342' such that no overlap exists. Similarly, inferred lane 342' is adjusted in comparison to inferred lane 342 of FIG. 5, with a lane boundary adjusted to be in parallel to a boundary of inferred lane 340'. Inferred lane 350' is adjusted in comparison to inferred lane 350 of FIG. 5, with a lane boundary adjusted to be in parallel to a boundary of inferred lane 352' such that no diverging area between the lanes exists. Similarly, inferred lane 352' is adjusted in comparison to inferred lane 352 of FIG. 5, with a lane boundary adjusted to be in parallel to a boundary of inferred lane 350'.

Figure 7:
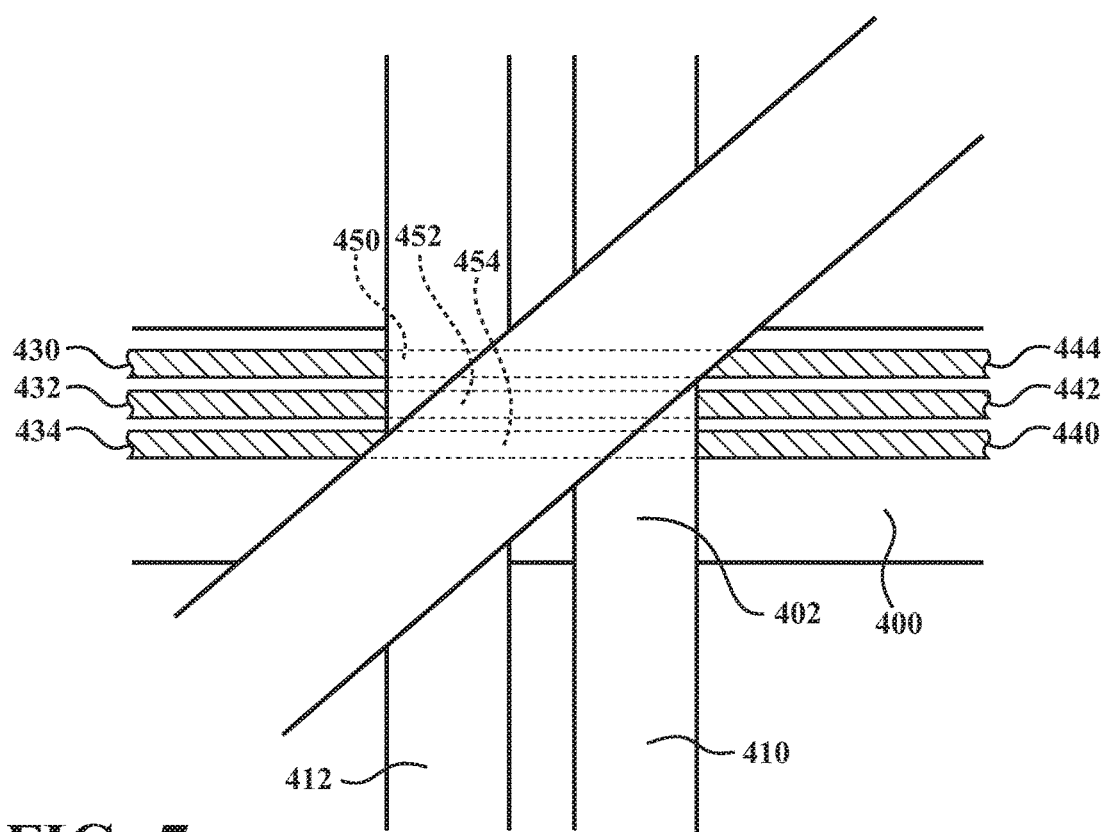
FIG. 7 illustrates an overhead plan view of a road including a road section obscured by a plurality of overpasses and a plurality of inferred lanes enabling a vehicle to traverse the road section, in accordance with the present disclosure.

Inferred lanes can be generated for use with a road section that is not well-marked, for example, including an intersection that has no or few lane markings. Similarly, inferred lanes can be generated for use with a road section that is difficult or impossible to monitor with available sensors. FIG. 7 illustrates road including a road section obscured by a plurality of overpasses and a plurality of inferred lanes enabling a vehicle to traverse the road section. Road 400 is illustrated obscured by overpass road 410, overpass road 412, and overpass road 420, such that a camera sensor, for example, operated upon a satellite in orbit cannot directly view lane markings upon road 400. A road section 402 can be identified wherein established lanes cannot be directly identified. Established lanes 430, 432, and 434 are illustrated upon a first side of road 400, and established lanes 440, 442, and 444 are illustrated upon a second side of road. Inferred lanes 450, 452, and 454 can be generated using aggregated vehicle telemetry to infer lane boundaries for each lane.

Figure 8:
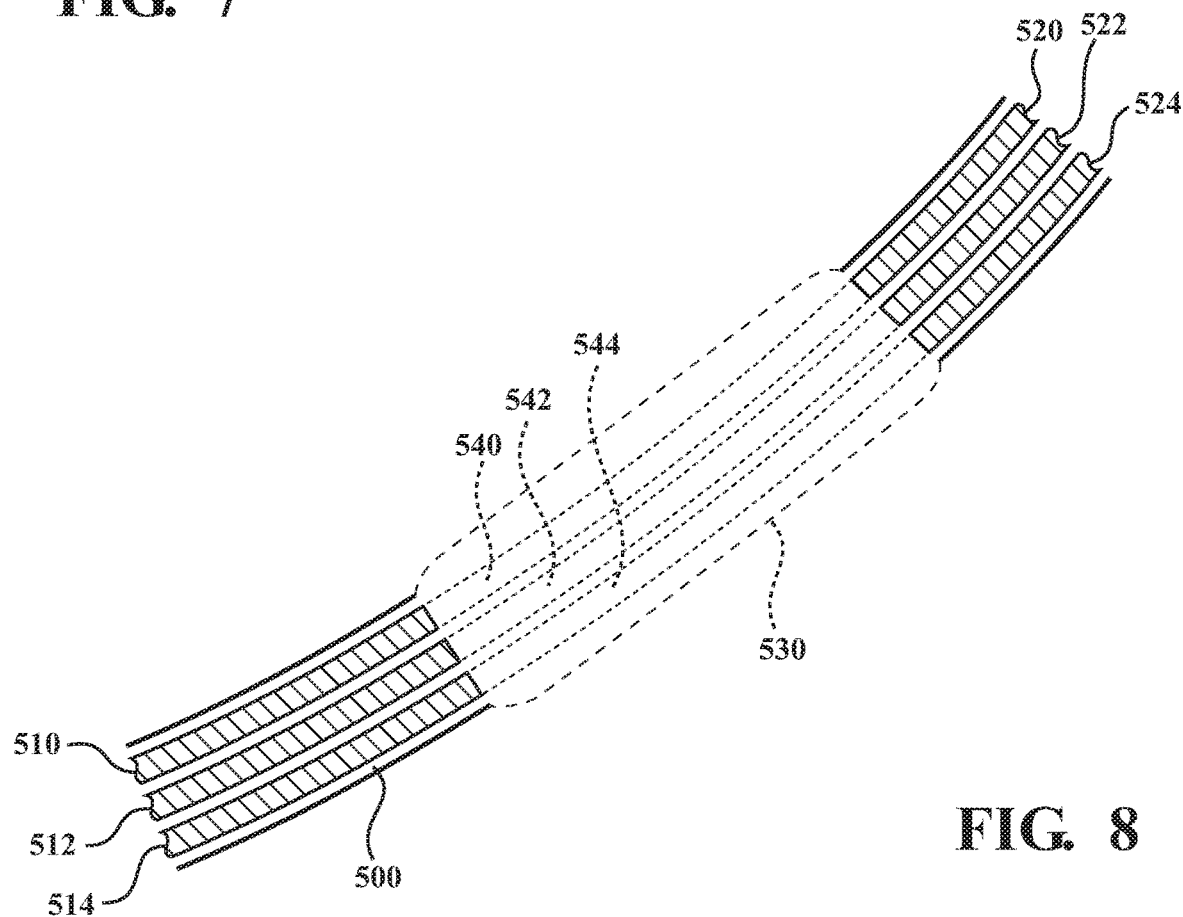
FIG. 8 illustrates an overhead plan view of a road including a road section where road markings are obscured from view and a plurality of inferred lanes enabling a vehicle to traverse the road section, in accordance with the present disclosure.

FIG. 8 illustrates a road including a road section where road markings are obscured from view and a plurality of inferred lanes enabling a vehicle to traverse the road section. Road 500 is illustrated including road section 530 where road markings are obscured from view. The road markings may be obscured by darkness, shadows, snow, blown leaves, or other condition that can prevent available sensors from monitoring the marked lanes upon road 500. Established lanes 510, 512, and 514 are illustrated upon a first side of road section 530, and established lanes 520, 522, and 524 are illustrated upon a second side of road section 530. Inferred lanes 540, 542, and 544 can be generated using aggregated vehicle telemetry to infer lane boundaries for each lane.

Figure 9:
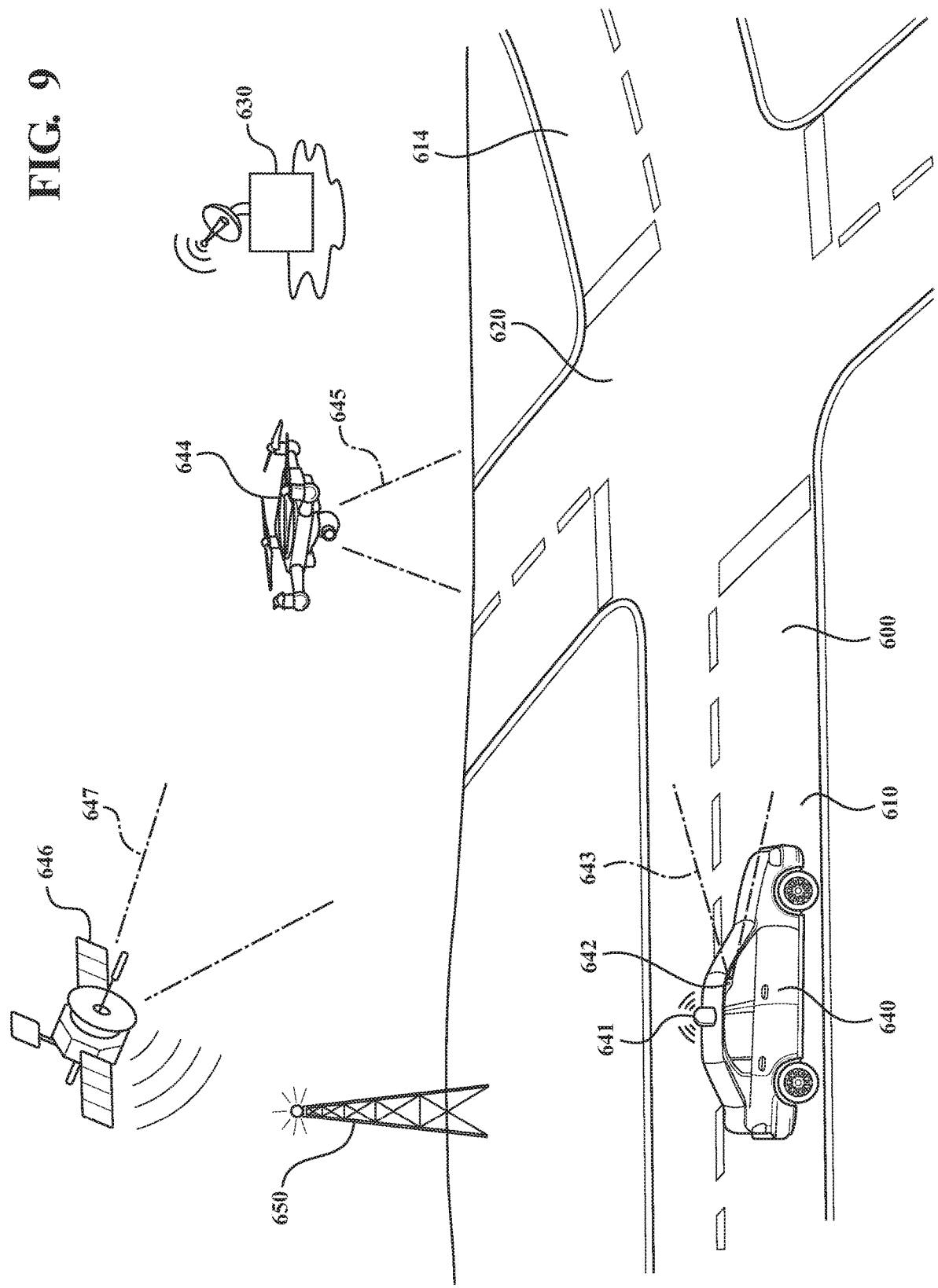
FIG. 9 illustrates a roadway including an intersection without lane markings and a plurality of devices configured to acquire information about the roadway, in accordance with the present disclosure.

FIG. 9 illustrates a roadway including an intersection without lane markings and a plurality of devices configured to acquire information about the roadway. Roadway 600 is illustrated including road 610, road 612, and road 614 which join at intersection 620. Intersection 620 can be identified as a road section that does not have lane markings upon the road surface. Various different sensor types and platforms can be used to generate sensor data that can be used to determine established lanes for a portion of road. Vehicle 640 is illustrated including a radar or LIDAR (light detection and ranging) sensor 641 operable to gather detailed information about roadway 600 and including camera device 642 operable to capture a sequence of images in field of view 643. Vehicle 640 can be a dedicated vehicle operated for the purpose of gathering information about roadway 600. In another embodiment, vehicle 640 can be a consumer operated vehicle gathering information for the purpose of navigating vehicle 640, but the information gathered by the vehicle can additionally be transmitted to remote server device 630 through communication with cell phone tower 650. Additionally, infrastructure device 644 embodied as an aerial drone can include a camera device capturing images in field of view 645. Infrastructure device 644 can alternatively include traffic cameras located upon poles or otherwise attached or maneuvered near roadway 600. Satellite 646 is additionally illustrated capturing images in view of view 647 from orbit. Information gathered by sensor devices of FIG. 9 can be used in accordance with the disclosed system and process to generate established lanes and inferred lanes. Other devices and methods can be utilized to gather information about roadway 600, and the disclosure is not intended to be limited to the examples provided herein.

Figure 10:
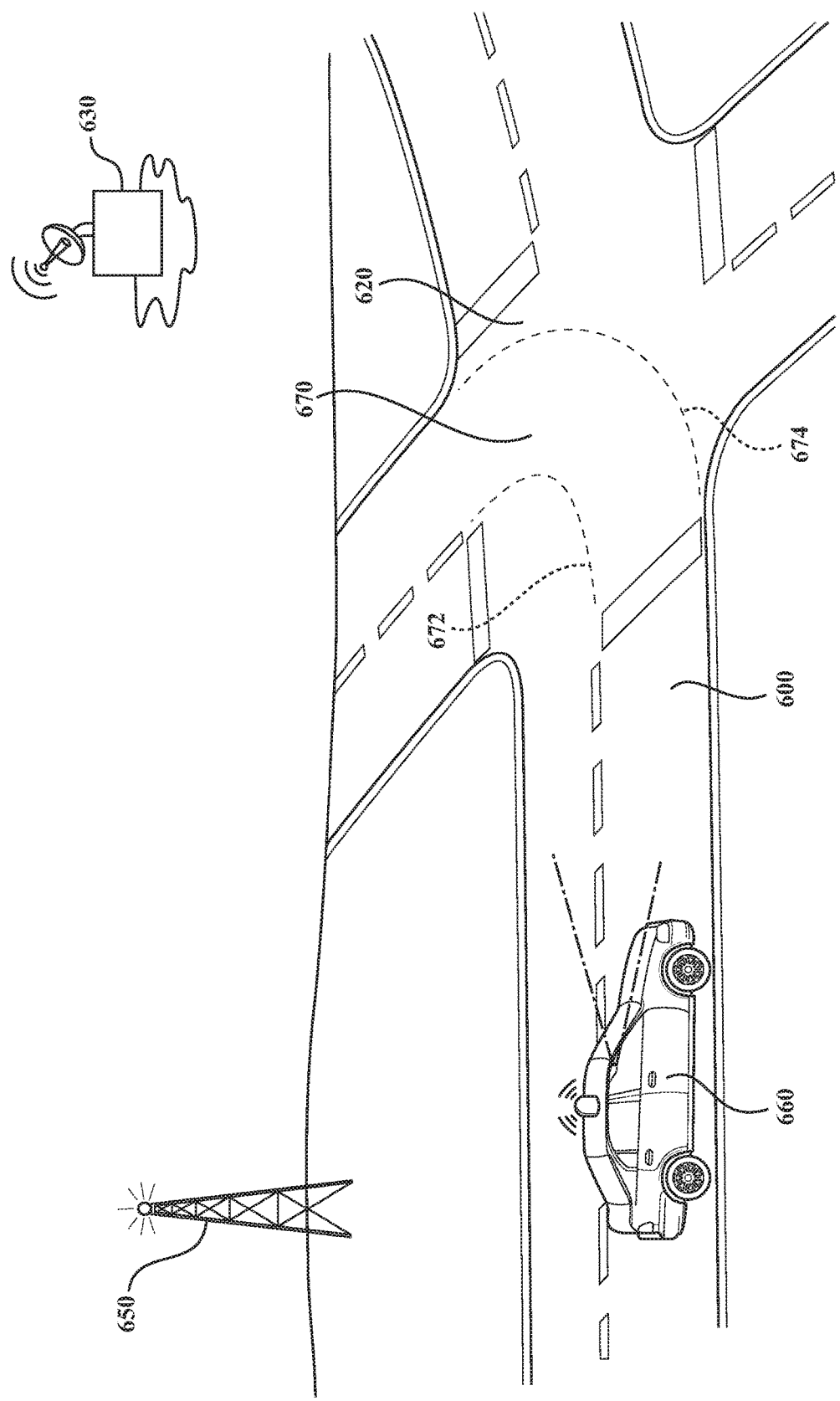
FIG. 10 illustrates a vehicle traversing the roadway of FIG. 9, utilizing an inferred lane to travel through the unmarked intersection, in accordance with the present disclosure.

FIG. 10 illustrates a vehicle traversing the roadway of FIG. 9, utilizing an inferred lane to travel through the unmarked intersection. Roadway 600 is illustrated including a consumer operated vehicle 660 traversing the roadway. Vehicle 660 provides telemetry data to remote server device 630 through communication with cell phone tower 650, and based upon the travel and telemetry data from a plurality of vehicles 660, aggregated vehicle telemetry can be acquired and utilized by remote server device 630 to define and generate inferred lane 670 through intersection 620. Inferred lane 670 includes a right lane boundary 674 and a left lane boundary 672, is communicated to vehicle 660 from remote server device 630, and provides guidance for vehicle 660 to travel through intersection 620.

Figure 11:
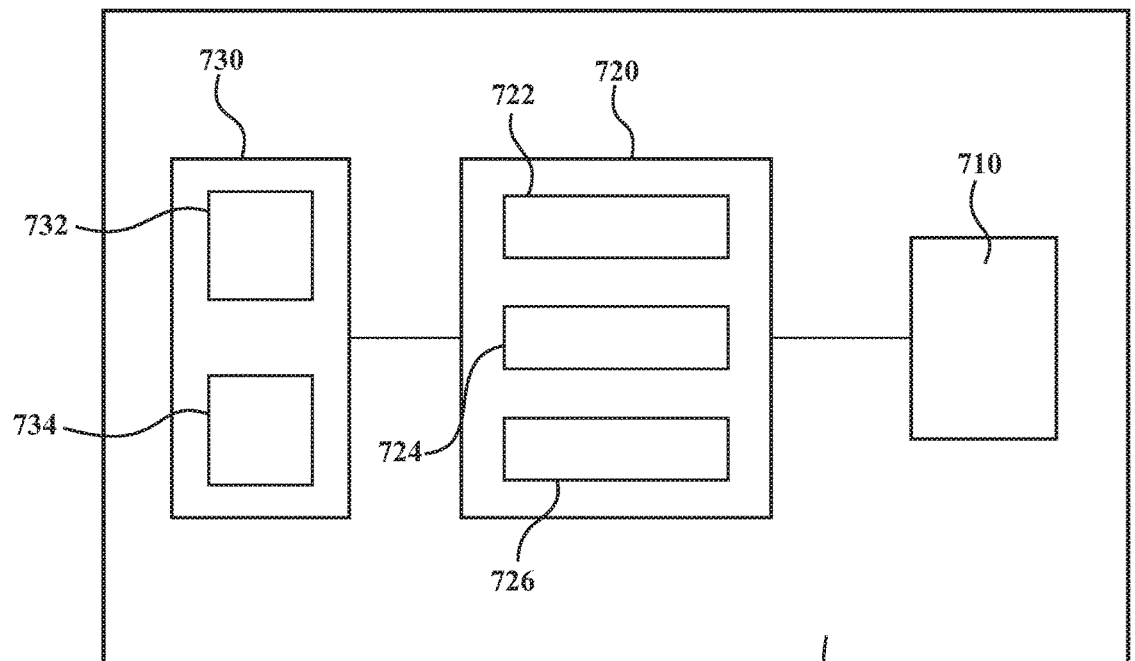
FIG. 11 illustrates an exemplary remote server device operable to utilize the disclosed process to generate inferred lanes, in accordance with the present disclosure.

FIG. 11 illustrates an exemplary remote server device operable to utilize the disclosed process to generate inferred lanes. Remote server device 630 includes computerized processing device 720, communications device 710, and memory storage device 730. It is noted that remote server device 630 may include other components and some of the components are not present in some embodiments.

The processing device 720 may include memory, e.g., read only memory (ROM) and random-access memory (RAM), storing processor-executable instructions and one or more processors that execute the processor-executable instructions. In embodiments where the processing device 720 includes two or more processors, the processors may operate in a parallel or distributed manner. Processing device 720 may execute the operating system of the remote server device 630. Processing device 720 may include one or more modules executing programmed code or computerized processes or methods including executable steps. Illustrated modules may include a single physical device or functionality spanning multiple physical devices. In the illustrative embodiment, the processing device 720 also includes vehicle registry and navigation module 722, digital map processing module 724, and inferred lane generation module 726, which are described in greater detail below.

The communications device 710 may include a communications/data connection with a bus device configured to transfer data to different components of the system and may include one or more wireless transceivers for performing wireless communication.

The memory storage device 730 is a device that stores data generated or received by the remote server device 630. The memory storage device 730 may include, but is not limited to, a hard disc drive, an optical disc drive, and/or a flash memory drive. Memory storage device 730 can include a digital map database 732 and an inferred lane database 734. Digital map database 732 can include stored and aggregated vehicle telemetry.

Vehicle registry and navigation module 722 includes programmed code operable to register and provide navigation and control data to a plurality of consumer vehicles operated upon a roadway. Vehicle registry and navigation module 722 is operable to process data regarding locations, trajectories, navigational destinations, and other relevant data about each registered vehicle and is operable to provide and receive communicative data to and from the registered vehicles. Vehicle registry and navigation module 722 is operable to collect and aggregate vehicle telemetry from a plurality of vehicles.

Digital map processing module 724 includes programmed code operable to access and update information related to a digital map stored in digital map database 732. Digital map processing module 724 is operable to determine and communicate established lanes upon a roadway.

Inferred lane generation module 726 utilizes aggregated vehicle telemetry to generate inferred lanes upon a road section where insufficient lane markings exist to directly establish lane boundaries or where lane markings are obscured from detection in accordance with the disclosed system and process.

Remote server device 630 is provided as an exemplary computerized device capable of executing programmed code to generate inferred lanes. A number of different embodiments of remote server device 630 and modules operable therein are envisioned, and the disclosure is not intended to be limited to examples provided herein.

Figure 12:
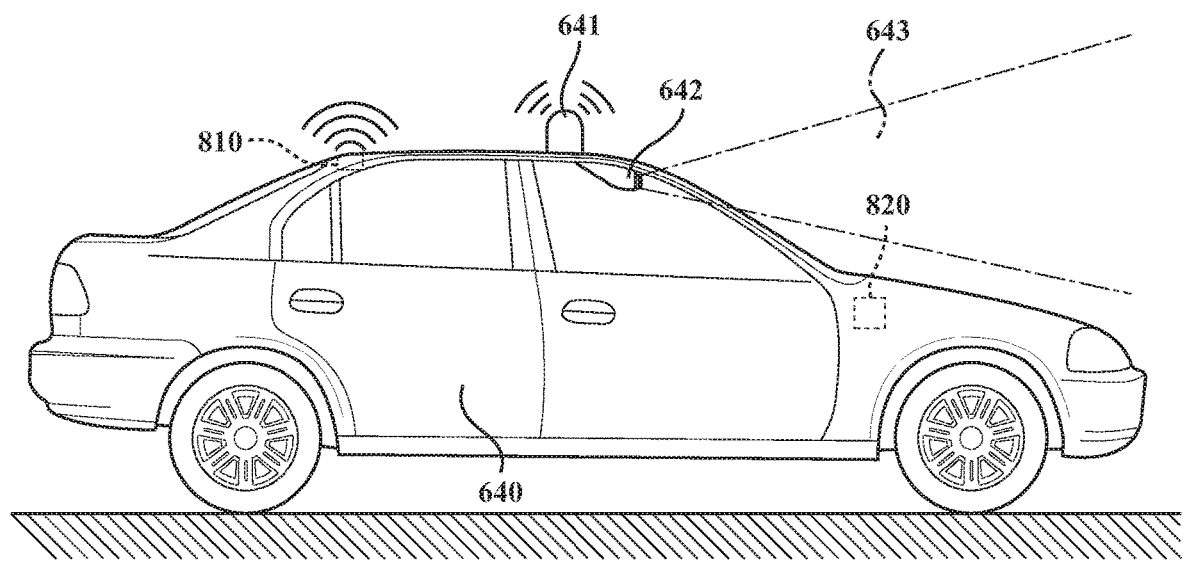
FIG. 12 illustrates a vehicle configured for autonomous or semi-autonomous navigation including utilization of inferred lanes, in accordance with the present disclosure.

FIG. 12 illustrates a vehicle configured for autonomous or semi-autonomous navigation including utilization of inferred lanes. Vehicle 640 is illustrated including a radar or LIDAR sensor 641 operable to gather detailed information about roadway 600 and including camera device 642 operable to capture a sequence of images in field of view 643. Vehicle 640 includes communications device 810 configured to permits vehicle 640 to send vehicle telemetry to a remote server device and receive navigational information such as established lanes and inferred lanes from the remote server device. Vehicle 640 includes a computerized navigation module 820 operable to receive information from the remote server device and utilize the information to autonomously or semi-autonomously control vehicle 640.

Figure 13:
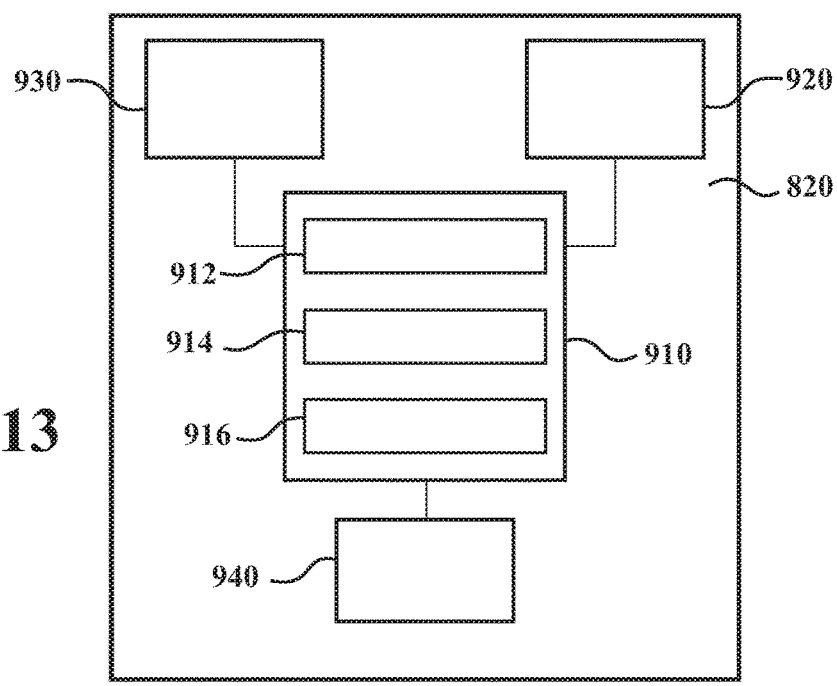
FIG. 13 schematically illustrates an exemplary computerized navigation control module, in accordance with the present disclosure.

Various control modules may be utilized within the disclosed system to operate the disclosed process. Control modules may include a computerized device including a computerized processor including memory capable of storing programmed executable code. A control module may be operated upon a single computerized device or may span several computerized devices. FIG. 13 schematically illustrates an exemplary computerized navigation control module. Computerized navigation module 820 includes processing device 910, communications device 920, data input output device 930, and memory storage device 940. It is noted that computerized navigation module 820 may include other components and some of the components are not present in some embodiments.

The processing device 910 may include memory, e.g., read only memory (ROM) and random-access memory (RAM), storing processor-executable instructions and one or more processors that execute the processor-executable instructions. In embodiments where the processing device 910 includes two or more processors, the processors may operate in a parallel or distributed manner. Processing device 910 may execute the operating system of the computerized navigation module 820. Processing device 910 may include one or more modules executing programmed code or computerized processes or methods including executable steps. Illustrated modules may include a single physical device or functionality spanning multiple physical devices. In the illustrative embodiment, the processing device 910 also includes vehicle telemetry module 912, incoming navigation information module 914, and vehicle navigation control module 916, which are described in greater detail below.

The data input output device 930 is a device that is operable to take data gathered from sensors and devices throughout the vehicle and process the data into formats readily usable by processing device 910. Data input output device 930 is further operable to process output from processing device 910 and enable use of that output by other devices or control modules throughout the vehicle.

The communications device 920 may include a communications/data connection with a bus device configured to transfer data to different components of the system and may include one or more wireless transceivers for performing wireless communication.

The memory storage device 940 is a device that stores data generated or received by the computerized navigation module 820. The memory storage device 940 may include, but is not limited to, a hard disc drive, an optical disc drive, and/or a flash memory drive.

Vehicle telemetry module 912 include programmed code operable to gather and provide as output vehicle telemetry for the vehicle including location and trajectory information.

Incoming navigation information module 914 includes programmed code operable to receive and process navigation information from a remote server device such as digital map information, established lane and lane boundary information, and inferred lane and lane boundary information.

Vehicle navigation control module 916 includes programmed code operable to receive and process information from various sources including from incoming navigation information module 914 and generates navigational instructions operable to autonomously or semi-autonomously control a vehicle.

Computerized navigation module 820 is provided as an exemplary computerized device capable of executing programmed code to utilize navigational information from a remote server device including inferred lanes. A number of different embodiments of computerized navigation module 820, devices attached thereto, and modules operable therein are envisioned, for example, including smart phones, virtual reality or augmented reality devices, and infrastructure devices, and the disclosure is not intended to be limited to examples provided herein.

Figure 14:
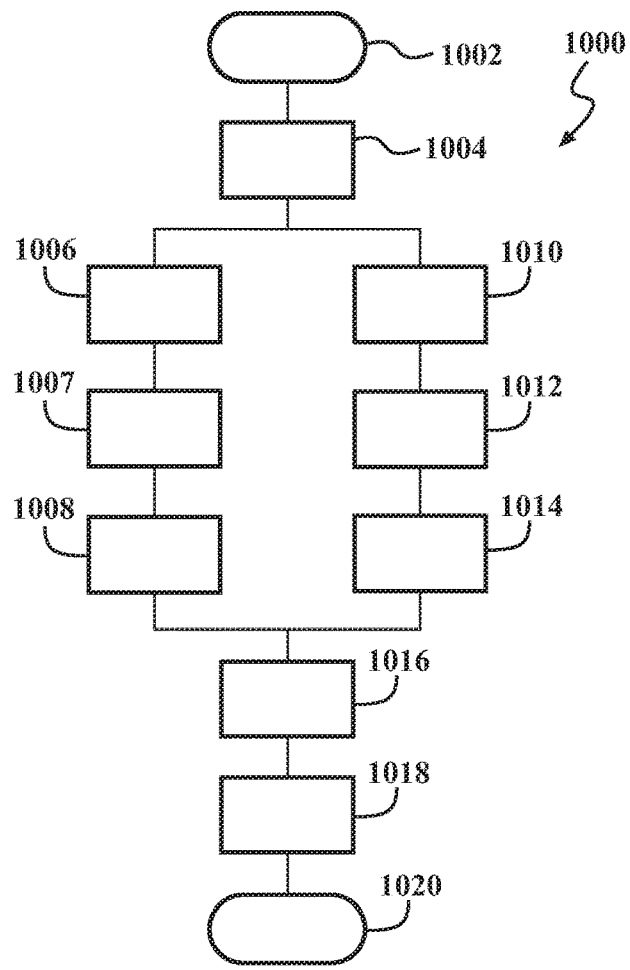
FIG. 14 is a flowchart illustrating an exemplary computerized process for generating inferred lanes, in accordance with the present disclosure.

FIG. 14 is a flowchart illustrating an exemplary computerized process for generating inferred lanes. Process 1000 starts at step 1002. At step 1004, a road section with insufficient markings or with obscured markings is identified. This identification can be performed by running a plurality of classifiers to detect stack roads or low confidence regions (e.g., road sections occluded by trees or covered by shadows where the road markings are not clearly visible) from aerial imagery, vehicle telemetry or by parsing the navigation maps. At step 1006, telemetry data from a plurality of vehicles is aggregated for the road section with insufficient markings or with obscured markings. At step 1007, the aggregated telemetry is normalized and denoised. In one embodiment, the data is subsequently converted to normal vectors representing vehicle paths. At step 1008, the aggregated telemetry data is analyzed to identify common source and sink pairs to identify inferred lanes for the road section with insufficient markings or with obscured markings. According to one embodiment, step 1008 can include associating telemetry points with nominal vectors and clustering vectors to create an inferred lane. According to one exemplary embodiment, the source can be identified as the road segment before the low confidence (i.e., section occluded by trees or shadow) or stack road section and sink can be identified as the road segment after. According to one exemplary embodiment, step 1008 includes identifying established lanes entering the road section, identifying trajectories that originate from each established lane entering the road section, analyzing the trajectories across the road section, and selecting a most common trajectory that originates from each of the established lanes as an inferred lane for the road section. At step 1010, a computerized processor extracts a road network at and bordering the intersection to determine established lanes for the road network. At step 1012, established lanes are paired and a source and a sink are identified for each established lane pair in the road network. At step 1014, segments of each pair are identified that border the road section with insufficient markings or with obscured markings. At step 1016, inferred lanes from step 1008 are paired with the identified segments of step 1014. At step 1018, for each matched lane pair, a trajectory is estimated and lane boundaries are inferred. The matched lane pair including the estimated trajectory and the inferred lane boundaries can be described as a unified lane geometry that can be published or utilized to navigate a vehicle across the road section. At step 1020, the process ends. Process 1000 is an exemplary process for generating inferred lanes for a road section with insufficient markings to directly establish lane boundaries or with obscured markings. A number of variations to the disclosed process are envisioned, and the disclosure is not intended to be limited to the examples provided.

Figure 15:
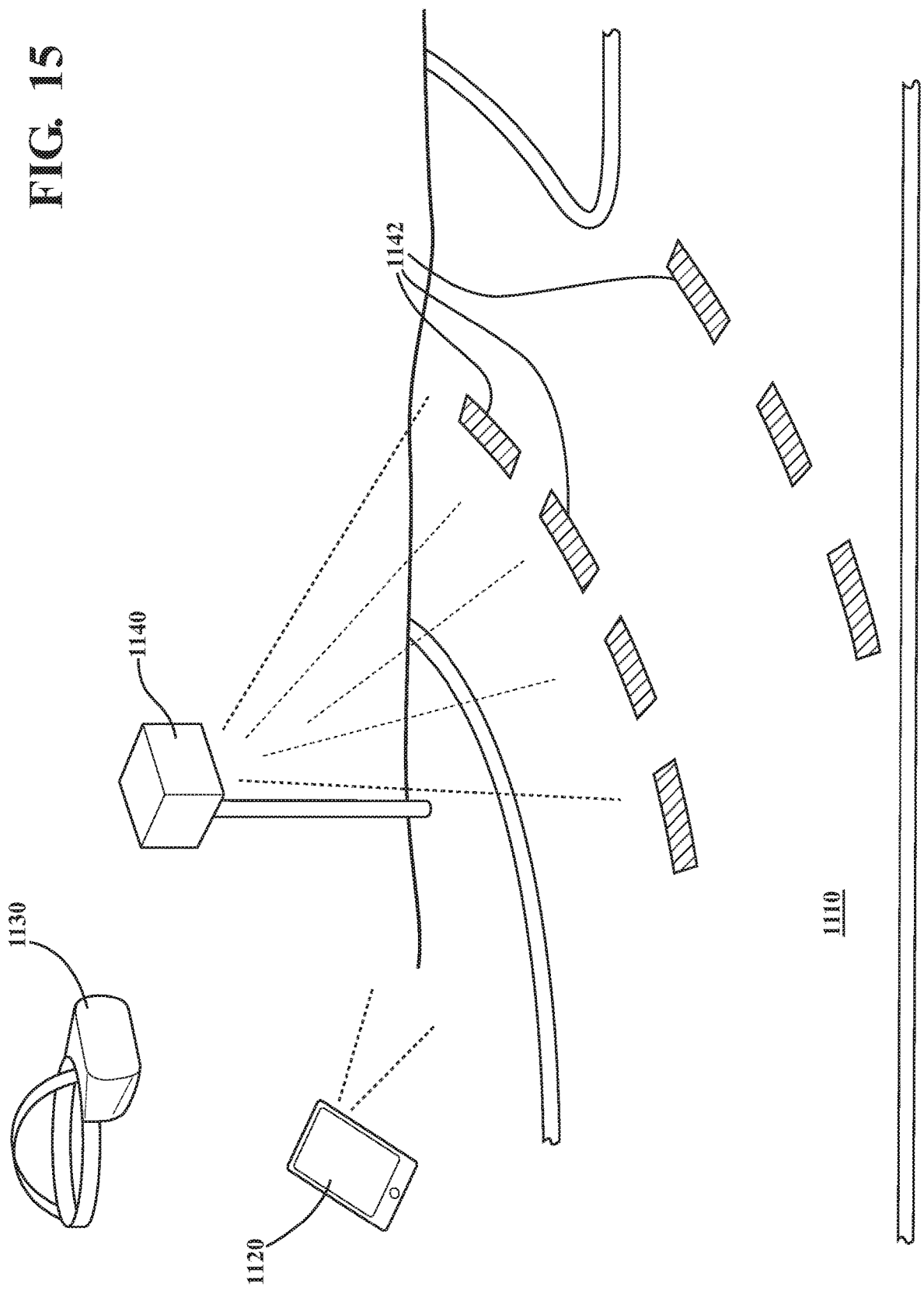
FIG. 15 illustrates a plurality of remote computing platforms operable to utilize transmitted unified lane geometries, in accordance with the present disclosure.

The disclosed system and process can be utilized directly in vehicle navigations, for example, with an autonomous or semi-autonomous vehicle. In another embodiment, the disclosed system and process can be utilized with a remote computing platform to provide navigation guidance, the remote computing platform including a device such as a smart phone, a virtual reality or augmented reality system, an infrastructure computing system, for example, projecting graphical images upon a roadway based upon inferred lanes. FIG. 15 illustrates a plurality of remote computing platforms operable to utilize transmitted unified lane geometries. Road section 1110 is illustrated including an intersection with insufficient markings to directly establish lane geometries. Smart phone 1120 and virtual/augmented reality visor 1130 are illustrated. Through communication over a communications network, smart phone 1120 and virtual/augmented reality visor 1130 can receive transmissions from a remote server device including unified lane geometries in accordance with the disclosed system and process. Similarly, infrastructure device 1140 can receive transmissions from the remote service device and can utilize the unified lane geometries, for example, to project graphics 1142 upon road section 1110 illustrating an inferred lane through road section 1110. In one embodiment, different graphics 1142 can be projected based upon current traffic signals. In one embodiment, graphics 1142 can be laser light projections. In one embodiment, road section 1110 can include reflective or luminescent paint configured to enhance a visibility of graphics 1142.

While the best modes for carrying out the disclosure have been described in detail, those familiar with the art to which this disclosure relates will recognize various alternative designs and embodiments for practicing the disclosure within the scope of the appended claims.

What is claimed is:

1. A system for inferring lane boundaries via vehicle telemetry for a road section, comprising:
a computerized remote server device operable to:
receive through a communications network sensor data describing lane markings upon roads bordering the road section, wherein the lane markings indicate lane geometries intersecting the road section;
determine established lanes upon roads bordering the road section based upon the lane markings described by the sensor data;
receive through the communications network the vehicle telemetry generated by a plurality of vehicles traversing the road section;
generate inferred lanes for the road section based upon the vehicle telemetry;
match the inferred lanes to the established lanes to generate unified lane geometries; and
publish the unified lane geometries.

2. The system of claim 1, wherein generating the inferred lanes for the road section based upon the vehicle telemetry comprises aggregating the vehicle telemetry.

3. The system of claim 2, wherein generating the inferred lanes for the road section based upon the vehicle telemetry further comprises normalizing the vehicle telemetry.

4. The system of claim 3, wherein generating the inferred lanes for the road section based upon the vehicle telemetry further comprises denoising the vehicle telemetry.

5. The system of claim 4, wherein generating the inferred lanes for the road section based upon the vehicle telemetry further comprises converting the vehicle telemetry to normal vectors representing vehicle paths.

6. The system of claim 1, wherein generating the inferred lanes for the road section based upon the vehicle telemetry comprises identifying trajectories that originate from each of the established lanes entering the road section, analyzing the trajectories across the road section, and selecting a most common trajectory that originates from each of the established lanes as an inferred lane for the road section.

7. The system of claim 1, wherein the computerized remote server device is further operable to identify the road section as a road section including insufficient lane markings to determine the established lanes.

8. The system of claim 1, wherein the computerized remote server device is further operable to identify the road section as a road section including obscured lane markings.

9. The system of claim 1, further comprising a vehicle navigating across the road section based upon one of the unified lane geometries.

10. The system of claim 1, wherein generating the inferred lanes for the road section based upon the vehicle telemetry comprises adjusting a lane boundary for one of the inferred lanes based upon a lane boundary for a second of the inferred lanes.

11. A system for generating inferred lanes for a road section, comprising:
a vehicle comprising a computerized navigation control module operable to:
generate vehicle telemetry for the vehicle; and
transmit the vehicle telemetry over a communications network;
a computerized remote server device operable to:
receive through the communications network sensor data describing lane markings upon roads bordering the road section, wherein the lane markings indicate lane geometries intersecting the road section;
determine established lanes upon roads bordering the road section based upon the lane markings described by the sensor data;
receive through the communications network vehicle telemetry generated by a plurality of vehicles traversing the road section;
generate inferred lanes for the road section based upon the vehicle telemetry;
match the inferred lanes to the established lanes to generate a unified lane geometry; and
transmit through the communications network the unified lane geometry to the vehicle; and
wherein the computerized navigation control module is further operable to:
receive the unified lane geometry; and
navigate the vehicle across the road section based upon unified lane geometry.

12. The system of claim 11, wherein generating the inferred lanes for the road section based upon the vehicle telemetry comprises aggregating the vehicle telemetry, normalizing the vehicle telemetry, and denoising the vehicle telemetry.

13. The system of claim 12, wherein generating the inferred lanes for the road section based upon the vehicle telemetry further comprises converting the vehicle telemetry to normal vectors representing vehicle paths.

14. The system of claim 11, wherein generating the inferred lanes for the road section based upon the vehicle telemetry comprises identifying trajectories that originate from each of the established lanes entering the road section, analyzing the trajectories across the road section, and selecting a most common trajectory that originates from each of the established lanes as an inferred lane for the road section.

15. A system for generating inferred lanes for a road section, comprising:
a computerized remote server device operable to:
receive through a communications network sensor data describing lane markings upon roads bordering the road section, wherein the lane markings indicate lane geometries intersecting the road section;
determine established lanes upon roads bordering the road section based upon the lane markings described by the sensor data;
receive through the communications network vehicle telemetry generated by a plurality of vehicles traversing the road section;
generate inferred lanes for the road section based upon the vehicle telemetry;
match the inferred lanes to the established lanes to generate unified lane geometries; and
transmit the unified lane geometries over the communications network; and
a remote computing platform operable to:
receive the unified lane geometries; and
provide navigation guidance based upon the unified lane geometries.

16. The system of claim 15, wherein the remote computing platform comprises a smart phone.

17. The system of claim 15, wherein the remote computing platform comprises a virtual reality device.

18. The system of claim 15, wherein the remote computing platform comprises an augmented reality device.

19. The system of claim 15 wherein the remote computing platform comprises an infrastructure device.

20. The system of claim 19, wherein providing navigation guidance based upon the unified lane geometries comprises projecting graphics upon the road section.

* * * * *